US008704752B2

(12) United States Patent
Wasinger et al.

(10) Patent No.: US 8,704,752 B2
(45) Date of Patent: Apr. 22, 2014

(54) DYNAMIC DIMMING LED BACKLIGHT

(71) Applicant: Manufacturing Resources International, Inc., Alpharetta, GA (US)

(72) Inventors: Jerry Wasinger, Alpharetta, GA (US); William Dunn, Alpharetta, GA (US)

(73) Assignee: Manufacturing Resources International, Inc., Alpharetta, GA (US)

(*) Notice: Subject to any disclaimer, the term of this patent is extended or adjusted under 35 U.S.C. 154(b) by 8 days.

(21) Appl. No.: 13/722,537

(22) Filed: Dec. 20, 2012

(65) Prior Publication Data

US 2013/0278640 A1 Oct. 24, 2013

Related U.S. Application Data

(62) Division of application No. 12/793,474, filed on Jun. 3, 2010, now Pat. No. 8,350,799.

(60) Provisional application No. 61/183,592, filed on Jun. 3, 2009.

(51) Int. Cl.
  *G09G 3/36* (2006.01)
(52) U.S. Cl.
  USPC .................................................. 345/102
(58) Field of Classification Search
  USPC .................................................. 345/102
  See application file for complete search history.

(56) References Cited

U.S. PATENT DOCUMENTS

| | | |
|---|---|---|
| 2005/0140640 A1 | 6/2005 | Oh |
| 2005/0140848 A1 | 6/2005 | Yoo et al. |
| 2006/0214904 A1 | 9/2006 | Kimura et al. |
| 2007/0047808 A1 | 3/2007 | Choe |
| 2007/0211179 A1* | 9/2007 | Hector et al. ............ 348/744 |
| 2007/0279369 A1 | 12/2007 | Yao et al. |
| 2008/0074372 A1 | 3/2008 | Baba et al. |
| 2008/0266331 A1 | 10/2008 | Chen |

FOREIGN PATENT DOCUMENTS

JP 2002366121 12/2002

* cited by examiner

*Primary Examiner* — Kevin M Nguyen
(74) *Attorney, Agent, or Firm* — Standley Law Group LLP

(57) ABSTRACT

A system and method for controlling subsections of an LED backlight for a liquid crystal display (LCD). Exemplary embodiments analyze the histograms for each subsection of the LCD which corresponds with the subsections of the LED backlight in order to produce a proper luminance for the backlight subsection. The proper luminance may be less than the maximum or typical luminance that is produced by common LED backlights. By reducing the luminance the resulting display can have less power consumption, longer lifetime, and higher contrast ratios. The original subpixel voltages for the LCD are re-scaled based on the proper luminance for the backlight subsection. Virtual backlight data may be created to simulate the luminance at each subpixel and the virtual backlight data may be used to re-scale the original subpixel voltages. The virtual backlight data may be used to blend between adjacent subsections of the LED backlight which may be producing different levels of luminance.

20 Claims, 11 Drawing Sheets

DYNAMIC DIMMING LED BACKLIGHT

CROSS-REFERENCE TO RELATED APPLICATIONS

This application is a divisional of and claims priority to U.S. application Ser. No. 12/793,474 filed on Jun. 3, 2010, now U.S. Pat. No. 8,350,799, which is herein incorporated by reference in its entirety.

TECHNICAL FIELD

Disclosed embodiments relate generally to an LED backlight having individually controlled subsections and an associated liquid crystal display.

BACKGROUND OF THE ART

Liquid Crystal Displays (LCDs) contain several layers which work in combination to create a viewable image. A backlight is used to generate the rays of light that pass through what is commonly referred to as the LCD stack, which typically contains several layers that perform either basic or enhanced functions. The most fundamental layer within the LCD stack is the liquid crystal material, which may be actively configured in response to an applied voltage in order to pass or block a certain amount of light which is originating from the backlight. The layer of liquid crystal material is divided into many small regions which are typically referred to as pixels. For full-color displays these pixels are typically further divided into independently-controllable regions of red, green and blue subpixels, where the red subpixel has a red color filter, blue subpixel has a blue color filter, and green subpixel has a green color filter. These three colors are typically called the primary colors. Of course, some displays may use additional color filters (such as adding a yellow filter) and these could also be used with the embodiments herein.

The light which is passing through each subpixel originates as "white" (or broadband) light from the backlight, although in general this light is far from being uniform across the visible spectrum. The subpixel color filters allow each subpixel to transmit a certain amount of each color (red, green or blue). When viewed from a distance, the three subpixels appear as one composite pixel and by electrically controlling the amount of light which passes for each subpixel color the composite pixel can produce a very wide range of different colors due to the effective mixing of light from the red, green, and blue subpixels.

Currently, the common illumination source for LCD backlight assemblies is fluorescent tubes, but the industry is moving toward light emitting diodes (LEDs). Environmental concerns, small space requirements, lower energy consumption, and long lifetime are some of the reasons that the LCD industry is beginning the widespread usage of LEDs for backlights.

LCDs are becoming popular for not only home entertainment purposes, but are now being used as informational/advertising displays in both indoor and outdoor locations. When used for information/advertising purposes, the displays may remain 'on' for extended periods of time and thus would see much more use than a traditional home theatre use. Further, when displays are used in areas where the ambient light level is fairly high (especially outdoors) the displays must be very bright in order to maintain adequate picture brightness. When used for extended periods of time and/or outdoors, overall energy consumption can become an issue. Thus, it is desirable to limit the power consumption of these displays as much as possible while maintaining image fidelity.

SUMMARY

Exemplary embodiments provide a backlight with individually controlled subsections. The luminance for each subsection can be controlled based on the image data being sent to the LCD. The incoming image data may be analyzed to determine the requirements for each subsection, and some may be selectively 'dimmed' if they correspond to portions of the image which do not require the full luminance output of the backlight. Selectively dimming portions of the backlight allows for several benefits, including but not limited to reduced power consumption, longer product lifetime, and higher contrast ratios.

These and other objects are achieved by a device as described in the following detailed description.

BRIEF DESCRIPTION OF THE DRAWINGS

A better understanding will be obtained from a reading of the following detailed description and the accompanying drawings wherein identical reference characters refer to identical parts and in which.

DETAILED DESCRIPTION

Figure 1:
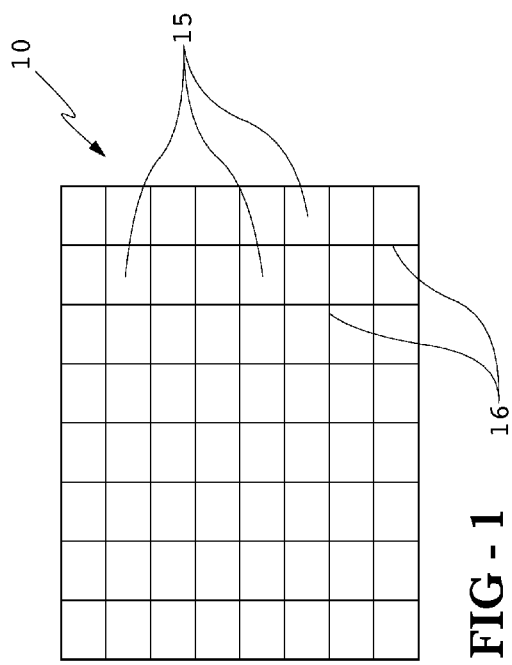
FIG. 1 is a front view of a backlight with individually controlled subsections.

FIG. 1 shows a backlight 10 which has been divided into several individually-controllable subsections 15. The backlight 10 produces light through a plurality of LEDs (not shown) which are mounted to the front face of the backlight 10. In this example, an 8×8 array of subsections 15 is shown. However, any number, shape, and size of subsections may be used with the various embodiments. The number of actual subsections may depend upon: the size of the display, cost, complexity of controlling circuitry desired, and desire for maximum power savings. Ideally, the greater number of subsections will provide a higher level of control and performance by the system. It should be noted that lines 16 are only used to represent the divisions regarding control of the subsections 15 and are not required as actual lines or physical divisions of the backlight 10.

Figure 2:
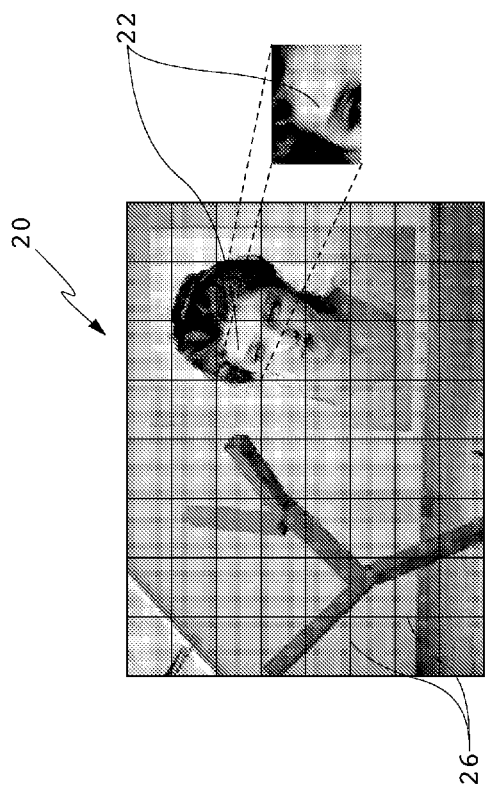
FIG. 2 is a front view of LCD image data where the image is divided into several subimages.

FIG. 2 provides the LCD image data 20, where this image is divided into subimages 22 which correspond with the subsections 15 of the backlight 10 (shown in FIG. 1). Again, the lines 26 are only used to represent the divisions of the subimages and are not physical divisions of the LCD and should not be visible through the LCD assembly.

Figure 3:
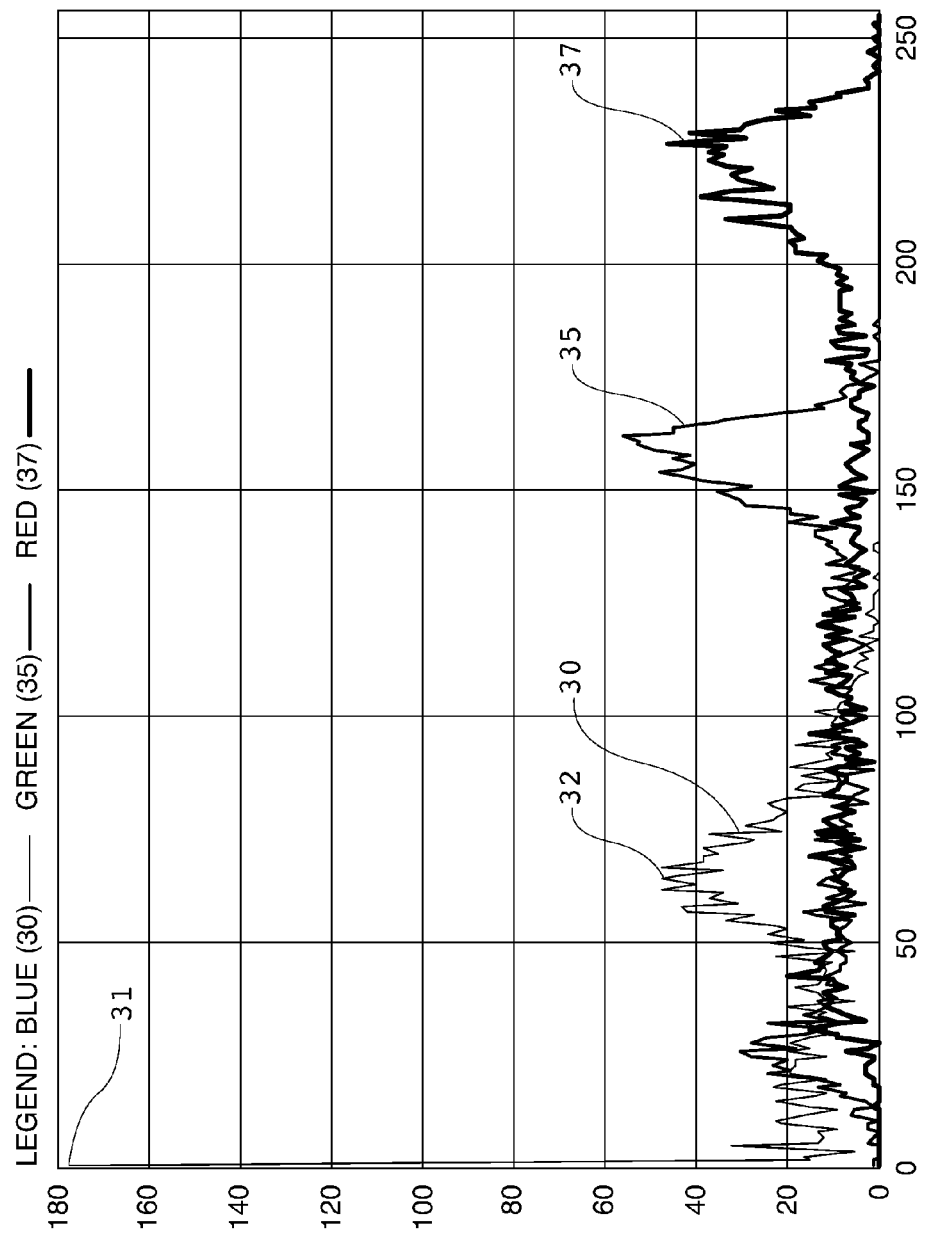
FIG. 3 is a histogram of a subimage.

FIG. 3 shows a plot of histogram data for one of the subimages 22 shown in FIG. 2. The brightness index value is shown along the x-axis and the number of pixels within the subimage which have the corresponding brightness index value is shown along the y-axis. Here, the brightness index values range from 0 (no saturation) to 255 (fully saturated). Three separate plots are shown in FIG. 3: red subpixels 37, blue subpixels 30, and green subpixels 35. It can be observed from this plot that the red subpixels will control the brightness requirements for the subsection of the backlight as the red subpixel histogram data is skewed to the right of the green 35 and blue 30 data. Further, it can also be observed that the blue data 30 is bimodal, meaning that there are two peaks in the data, a first one 31 near zero and a second one 32 near 60. This bimodal characteristic will be discussed further below.

Figure 4:
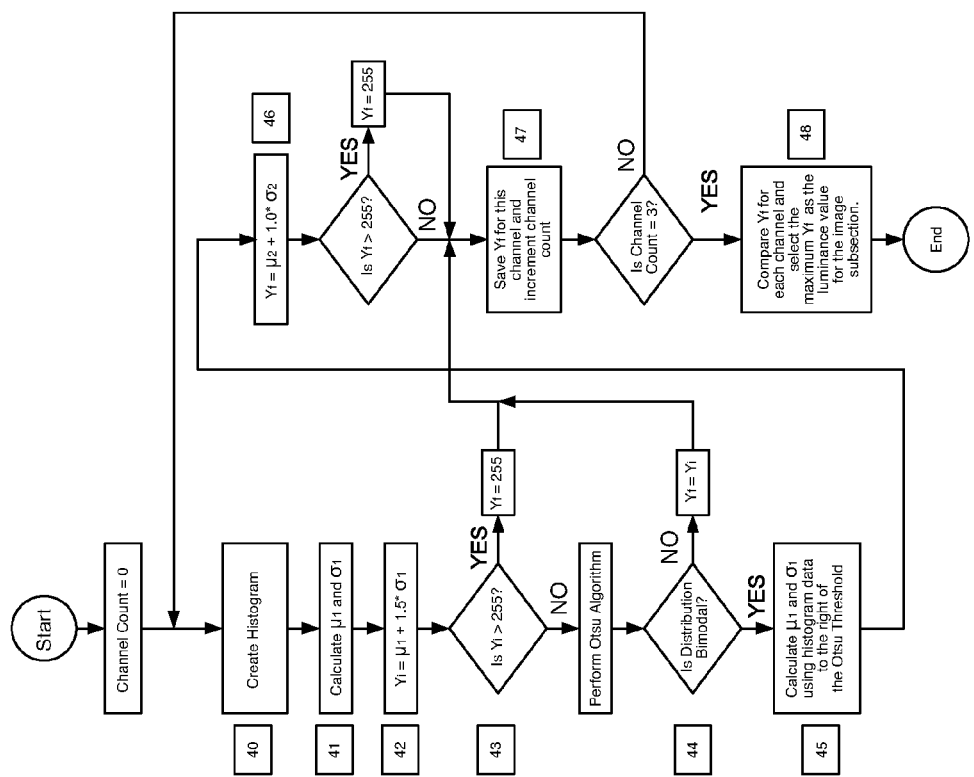
FIG. 4 is a flow chart for one embodiment for analyzing the subimage histogram data.

The histogram data for each subimage is analyzed to determine the proper luminance level for the backlight subsection corresponding to each subimage. FIG. 4 shows one embodiment for analyzing the histogram data for each channel (in this example: red, green, and blue) to determine the proper luminance setting for the backlight subsection.

Once the histogram data has been created 40, a first average $\mu_1$ and standard deviation $\sigma_1$ are calculated 41. The following is one method for calculating these values and analyzing them:

Let N=the total number of pixels (red, green, or blue) in the subimage.

Denote the histogram as H(i) where i ranges from 0 to 255

Calculate the average from:

$$\mu_1 = \frac{1}{N} \sum_{i=0}^{255} i \cdot H(i)$$

Calculate Standard Deviation $$\sigma_1 = \sqrt{\frac{1}{N}\left(\sum_{i=0}^{255} H(i) \cdot i^2\right) - \mu_1^2}$$

The initial luminance value for this subsection of the backlight may then be calculated 42 as the average value plus one and a half standard deviations. $Y = \mu_1 + 1.5 \cdot \sigma_1$. It should be noted that one and a half standard deviations was chosen as effective for one embodiment. Depending on several factors, some systems may require more or less than 1.5 standard deviations for adequate system performance. This variable could be adjusted for each display.

The backlight luminance can range from 'off' to 'full on' and these points, along with all of the settings in between, should be calibrated with the brightness index values from the histogram which can also vary from 0 (off) to 255 (full on).

Thus, once the initial luminance value is calculated it may be compared with the maximum value of 255 (see step 43). If the initial luminance value is greater than 255, then the backlight luminance for this subsection is simply set to full on (255) and is stored for this channel (go directly from step 43 to step 47). The use of 'channel' herein denotes one of the primary colors that are used to create the image within the LCD. As discussed above, a typical LCD contains three channels (Red, Green, and Blue) but other LCD designs may use additional colors (such as Yellow) and thus may contain 4 or more channels.

Next, the histogram data for this channel may be tested for a bimodal distribution 44. This step may be performed because if the distribution contains multiple peaks, simply averaging and adding some amount of standard deviations may completely miss a peak which would require a higher backlight level. For example, in reference to FIG. 3, as mentioned above, the blue curve 30 may be considered bimodal. The initial luminance $Y_i$ for the blue curve 30 may fall somewhere in between peaks 31 and 32, thus missing the peak 32 which requires the highest amount of backlight (i.e. if the blue curve were driving the backlight level, the minimum luminance level would have to be closer to 70, to ensure that peak 32 achieves its necessary illumination). In this particular case however, it would not affect the outcome of the analysis because the highest luminance value between the three channels is the value which will be finally used for the subsection (see step 48 in FIG. 4). However, the test for bimodal distribution may still be performed to ensure that the driving color (in this particular case the red channel is actually the driving color) does not contain several peaks such that one would not be adequately illuminated.

The following is one method for determining if a histogram is bimodal 44. Using Otsu's algorithm, find the optimal separation point between distributions in the histogram:

$$C = nB(T)nO(T)[\mu B(T) - \mu O(T)] \quad \text{(Otsu's algorithm)}$$

where:

T is the threshold value and ranges from 0 to 255 nB(T) is the number of pixels that fall below the threshold value nO(T) is the number of pixels that fall above the threshold value μB(T) is the average value of the pixels below the threshold value μO(T) is the average value of the pixels above the threshold value Perform Otsu's algorithm for each for each value of T in the histogram and determine the T which corresponds to the maximum value of C (this will be referred to as $T_{max}$ also known as the Otsu Threshold).

Compare $T_{max}$ to the first average value $\mu_1$.

If, $|T_{max} - \mu_1| \leq \Delta$, then the histogram data is not bimodal and the luminance value for the subsection is equal to the initial luminance value. $Y_f = Y_i$ Note, Δ may be selected for each display setup and may need to be adjusted depending on the type of display and what is being shown on the display. Acceptable results have been found for some displays with a Δ value near 10.

If, $|T_{max}-\mu_1|>\Delta$, then the histogram data is bimodal and the following steps should be performed:

Calculate a second average and a second standard deviation based on the histogram data to the right of the Otsu Threshold $T_{max}$. (see step 45 in FIG. 4)

Set $j=T_{max}$.

$$N = \sum_{i=j+1}^{255} H(i)//$$

Set N to new sample size
Calculate the Second average from:

$$\mu_2 = \frac{1}{N}\sum_{i=j+1}^{255} i \cdot H(i)$$

Calculate the Second Standard Deviation from:

$$\sigma_2 = \sqrt{\frac{1}{N}\left(\sum_{i=j+1}^{255} H(i)\cdot i^2\right) - \mu_2^2}$$

The final luminance value ($Y_f$) for this channel can then be calculated 46 as the average plus one standard deviation. $Y_f=\mu_2+1.0\cdot\sigma_2$ Again, acceptable results have been found by using one standard deviation, but different display setups may require a different number of standard deviations. This final luminance value should be compared to the maximum luminance value possible (255) and if it is larger than this value, the luminance value will simply be stored as the maximum luminance of 255. (If $Y_f>255$ then $Y_f=255$) The final luminance value for this channel is then stored 47 and steps 40-47 are repeated for the remaining two channels. Finally, when the final luminance value for all three channels (R, G, and B) has been determined, they are compared with one another and the largest final luminance value $Y_f$ is stored 48 as the proper luminance value for the backlight subsection.

Figure 5:
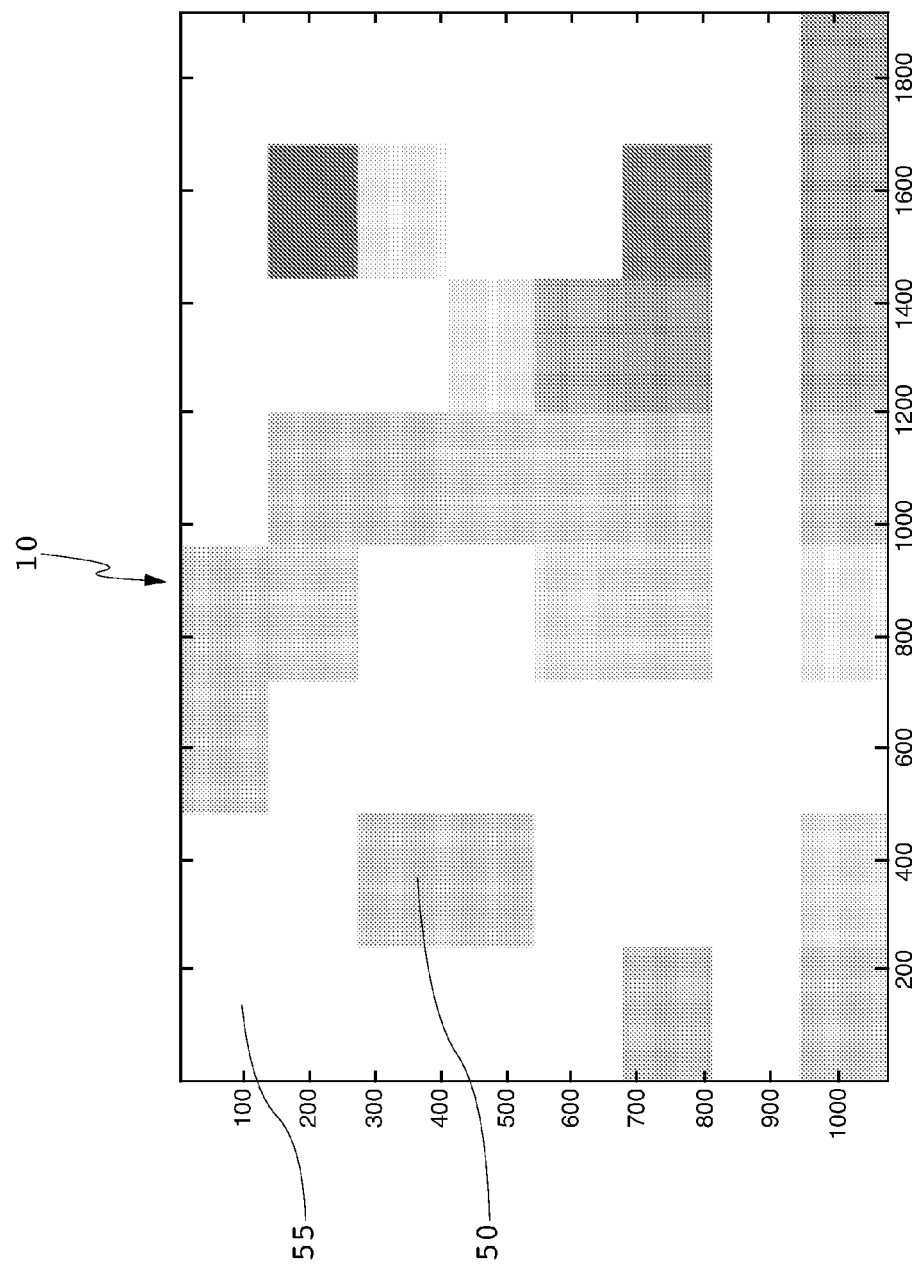
FIG. 5 is a front view of the backlight where each subsection is being driven at the appropriate luminance level based off the histogram data for the corresponding subimage.

FIG. 5 shows what the backlight 10 may look like once each of the luminance values has been stored and the corresponding subsections are driven at their proper luminance values (after Gamma correction has been performed, if necessary—see below for more information on Gamma correction). This may involve a conversion of the luminance values to current/voltage levels and can easily be accomplished by one skilled in the art by creating a linear relationship where luminance level 0 corresponds with 0 amps (or volts) and luminance level 255 corresponds to x amps (or volts), where x represents the power level that generates the maximum luminance from the LEDs). It can be easily observed from FIG. 5 that some subsections are completely on (white) while others are slightly gray to dark grey. The capability of dimming these sections of the backlight will save power as well as provide a deeper black/dark color since the backlight is not shining through the liquid crystal material at full luminance.

Figure 6:
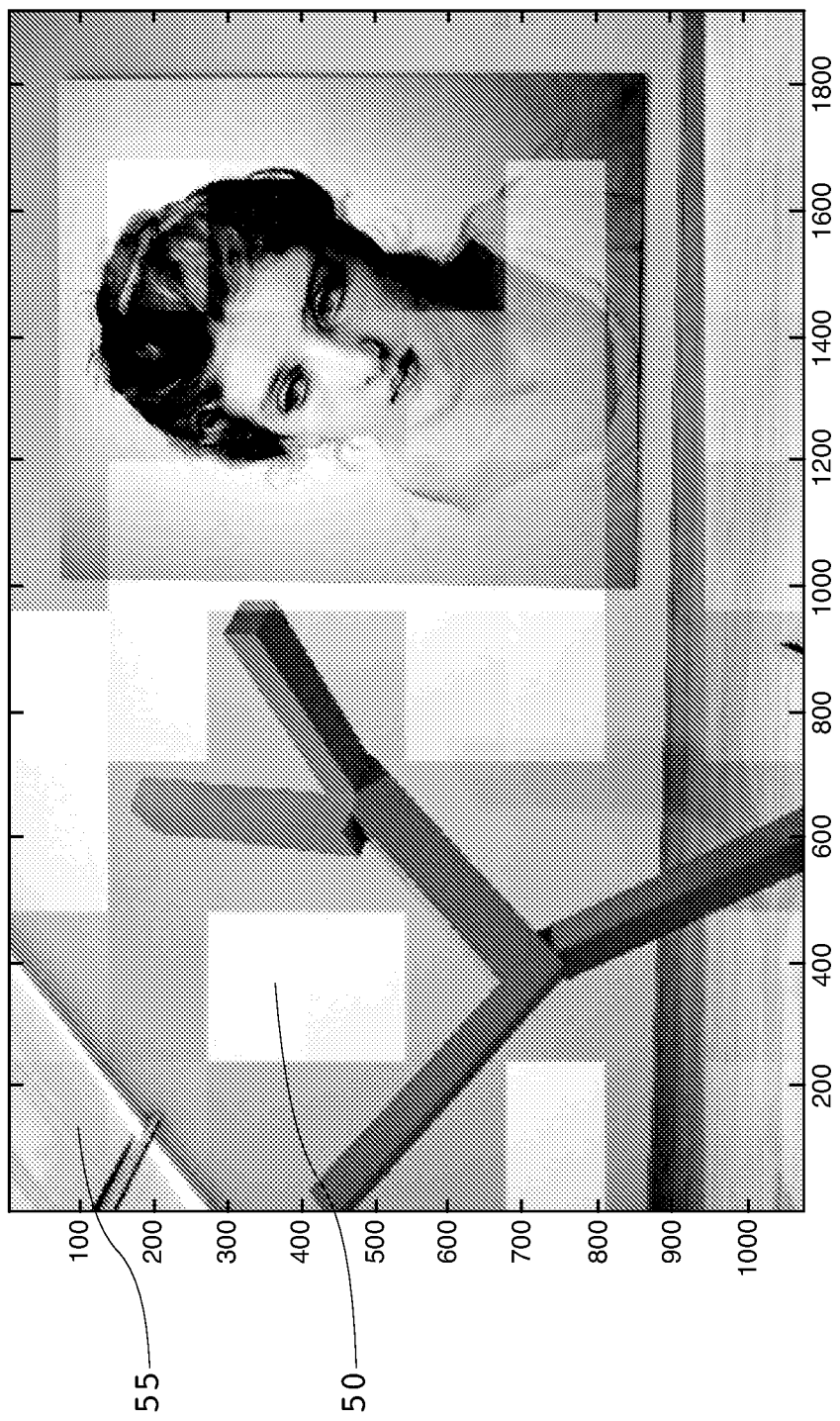
FIG. 6 is a front view of the re-scaled LCD image data.

However, LCD subpixel voltages are typically determined based on a 'full on' backlight and when sections of the backlight are dimmed, the subpixel voltages may need rescaled ('adjusted') to ensure that the picture fidelity remains high and the proper colors are produced by the display. One method for rescaling the LCD subpixel voltages is to divide the subpixel voltage by the ratio of proper luminance level to maximum luminance. FIG. 6 shows the resulting LCD image data (without the adjusted backlight levels) once it has been rescaled based on the calculated backlight luminance levels.

For example, subsection 50 shown in FIG. 5 may have a luminance level of 128. This would be 128 out of a possible 255 (maximum luminance), resulting in 128/255=approximately ½. As an illustration, assume that one of the subpixel voltages for subsection 50 was originally 1 mV. To rescale this subpixel voltage, divide 1 mV by ½. Now, the subpixel voltage should be 2 mV. Assuming that we are dealing with a normally black LCD stack (voltage is required to orient the crystals to pass light) this increase in subpixel voltages is required because we have decreased the backlight level. Thus, from FIG. 5 we know that the backlight will decrease approx. 50% at subsection 50, so in order to create the original colors in the image, the subpixel voltage must be increased in order to allow more light through the liquid crystals. The seemingly brighter resulting LCD image for subsection 50 can be observed in FIG. 6. Note, that FIG. 6 only shows the image data and does not take into account the actual backlight levels that are illuminating the LCD, so although subsection 50 appears lighter, this will be accounted for once the new backlight levels are applied.

As a second example, subsection 55 shown in FIG. 5 may have a luminance level of 255 (maximum luminance). This would be 255/255, or 1. Thus, assuming any original subpixel voltage for subsection 55, say V, the resulting scaled subpixel voltage would be identical because the backlight subsection remains at full on. V/1=V. This can be observed in FIG. 5 as the subsection 55 appears white. Also notice that subsection 55 in FIG. 6, appears identical to the original image in FIG. 2 because the backlight remains at 'full on' so the subpixel voltages have not been altered from their original settings.

Figure 7:
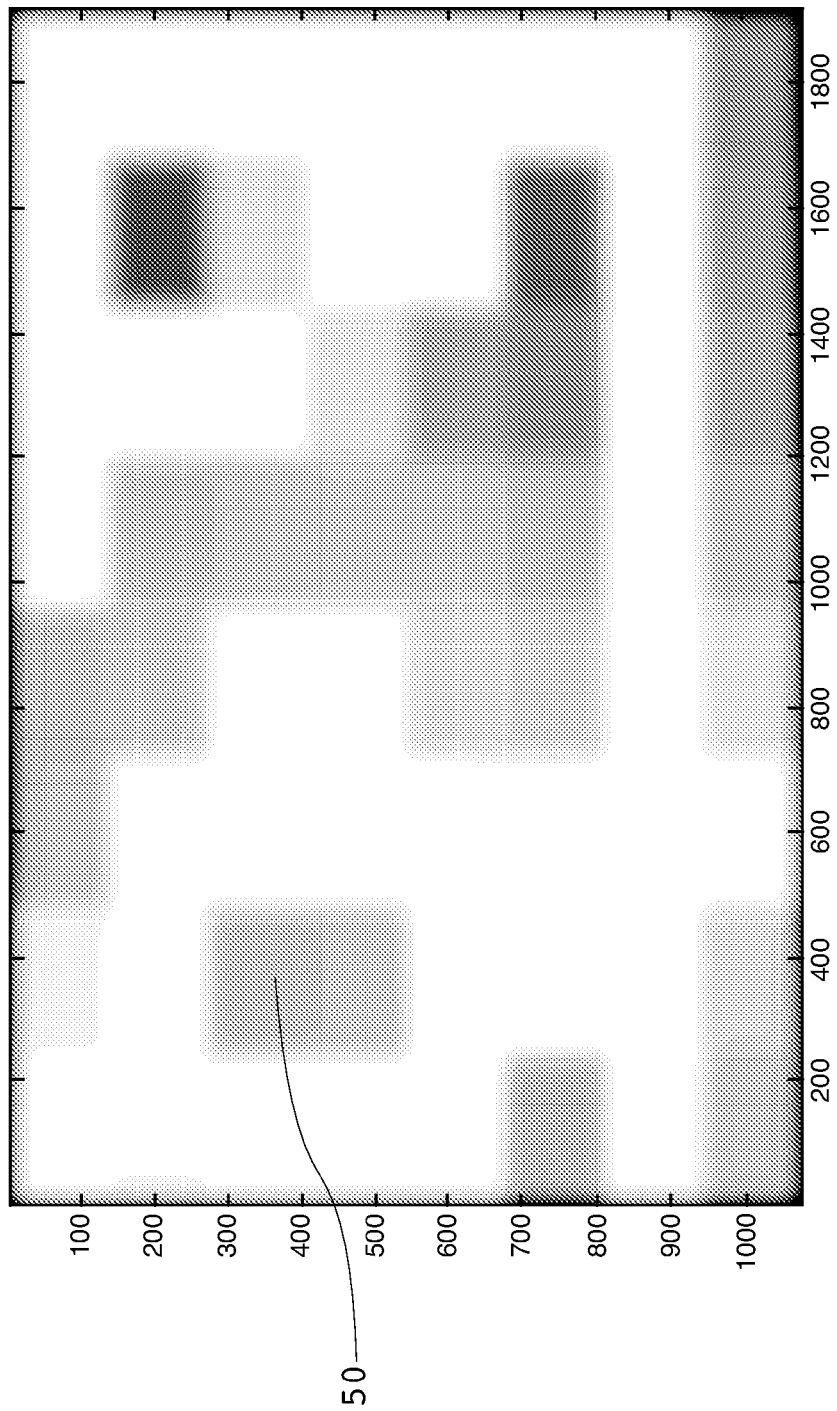
FIG. 7 is a front view of the backlight from FIG. 4 after diffusion.
Figure 8:
FIG. 8 is the image resulting from combining the diffuse backlight of FIG. 7 with the rescaled LCD image of FIG. 6.

It is common in LCD assemblies to place a light diffusing/scattering element (herein 'diffuser') in between the backlight and the liquid crystal material in order to provide a more uniform appearance of light through the display. Without the diffuser, the LED point-sources of light may be visible through the final display. Thus, when the backlight from FIG. 5 is placed behind a diffuser, the resulting luminance pattern can be seen in FIG. 7. Further, when the diffused backlight from FIG. 7 is placed behind the rescaled LCD image data from FIG. 6, the resulting image from the LCD is shown in FIG. 8.

As can be easily observed, the diffusing properties alter the actual luminance levels of the backlight, especially near the edges of the subsections. Looking at subsection 50 for example, the luminance in the center 51 is acceptable, while the luminance near the edges 52 has been increased due to 'bleed over' from brighter adjacent subsections 60.

One method discovered to account for this phenomenon is the creation of a 'virtual backlight' or 'VB' where the 'bleed over' behavior of adjacent subsections can be mathematically modeled and accounted for during the rescaling of the LCD subpixel voltages. There are many methods for mathematically modeling a given backlight in order to create a VB.

Figure 9:
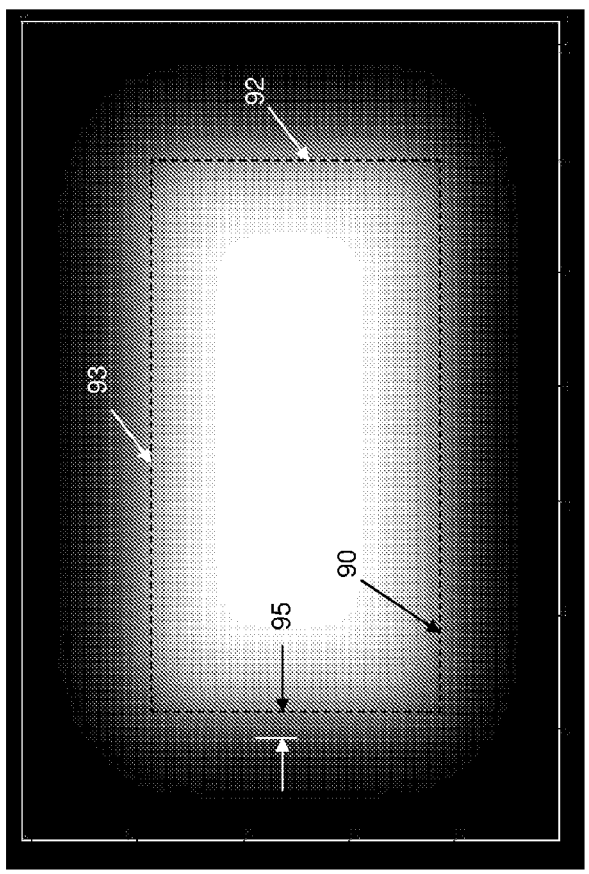
FIG. 9 a surface plot of a fully illuminated subsection of the backlight that has been convolved with a Gaussian filter.

One method for creating the VB may be referred to as 'virtual subsections' and is based on the use of a stored matrix of data that represents the appearance of a single, fully illuminated subsection in the backlight assembly as seen through the diffuser. FIG. 9 provides a surface plot of a fully illuminated subsection 90 that has been convolved with a Gaussian filter. The subsection 90 has a width (W) 93, height (H) 92, and a tail (T) 95, where W, H, and T are each measured in pixels. The tail 95 represents the subpixels which may be impacted by the luminance from adjacent subsections of the backlight. In other words, illumination of the subsection that extends beyond the physical edge of the subsection 90. Thus, the dimensions of the stored matrix for the subsection would be (2T+W)×(2T+H). Because the virtual subsection is larger than the actual subsection, the adjacent subsections may be overlapped and the principle of additive light may be used to blend the edges of the subsections.

Figure 10:
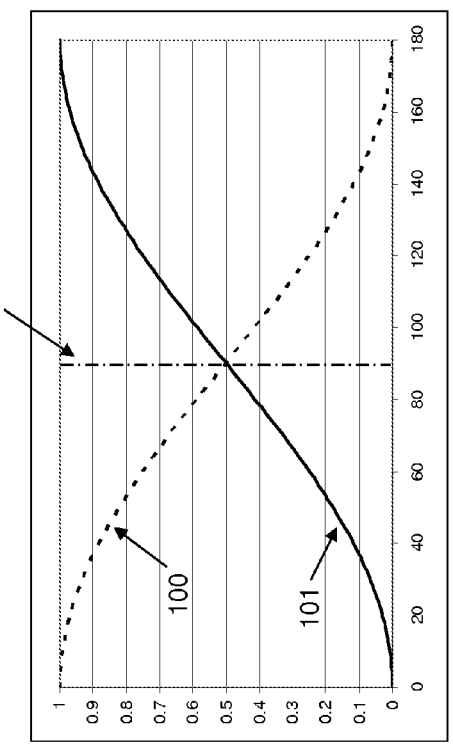
FIG. 10 is a plot of relative luminance versus physical position on a pair of adjacent subsections when using the virtual subsection method.

FIG. 10 illustrates the relative luminance versus physical position on a pair of adjacent subsections. The x-axis of this figure represents the pixel location while the y-axis represents the relative luminance of the backlight subsections. Relative luminance refers to the percentage of the backlight luminance Y, which was determined for the subsection (subsection) in FIG. 4. Thus, 0.5 would represent one-half of the luminance, 0.25 would represent one-quarter of the luminance, etc. The plot for a first subsection 100 and an adjacent second subsection 101 are shown. The line 105 represents the physical dividing line between the subsections. Looking at the first subsection 100, at pixel zero the full luminance level is recorded. The relative luminance decreases as the pixel location increases (as we approach the division between the subsections 105). At pixel 90, only half of the full luminance level is recorded. As the pixel location continues to increase (as we move away from the division between the subsections 105) the relative luminance continues to decrease until it reaches zero at pixel 180. Thus, for this example the tail T, of each subsection may be 90 pixels long. A symmetrically-opposite trend can be seen with the plot for the adjacent subsection 101.

It should be noted that because the plot for the adjacent subsections 100 and 101 are symmetrical about line 105 and about the relative luminance of 0.5, if the subsections were driven to the same backlight luminance level they would blend to create 100% luminance across the line 105 between the subsections. Obviously, at line 105 the VB data for each subsection is at 0.5 or 50% of the backlight luminance for that subsection, so if each subsection were driven to the same backlight luminance, these would add together to create the same luminance level across the line 105. If the subsections were driven to different luminance levels, as the VB data is entered, this will blend between the different luminance levels. For example, at pixel location 38 within subsection 100, the VB data should be 90% of the luminance for subsection 100 plus 10% of the luminance for subsection 101.

Obviously, the relationship shown in FIG. 10 is only applied to adjacent subsection edges and to subpixels which are within the 'tail' portion of the adjacent subsections. Thus, subsection edges which are not adjacent to any other subsections (i.e. along the perimeter of the overall display) may not show this relationship and may simply use 100% of the luminance level as the VB data for that subsection.

By using the luminance values for each backlight subsection along with the model for backlight luminance along the subsection edges, an array of VB data for each subsection can be stored and then combined to create a larger array which contains VB data for each pixel in the display. As discussed above, the original subpixel voltages may then be divided by the ratio of VB data over the maximum backlight value in order to properly rescale the original LCD image data.

It should be noted that although a Gaussian curve has been used in FIG. 10 to represent the relationship between adjacent subsections, this is not required. For some embodiments a linear relationship or exponential function may provide a more appropriate mathematical representation of what is actually occurring with the diffused backlight. Other mathematical models are discussed below. This brings up an interesting point to keep in mind when designing this type of system. Either a mathematical system can be derived to model the existing physical backlight or the physical backlight may be designed so that it performs similar to a selected mathematical model.

Figure 11:
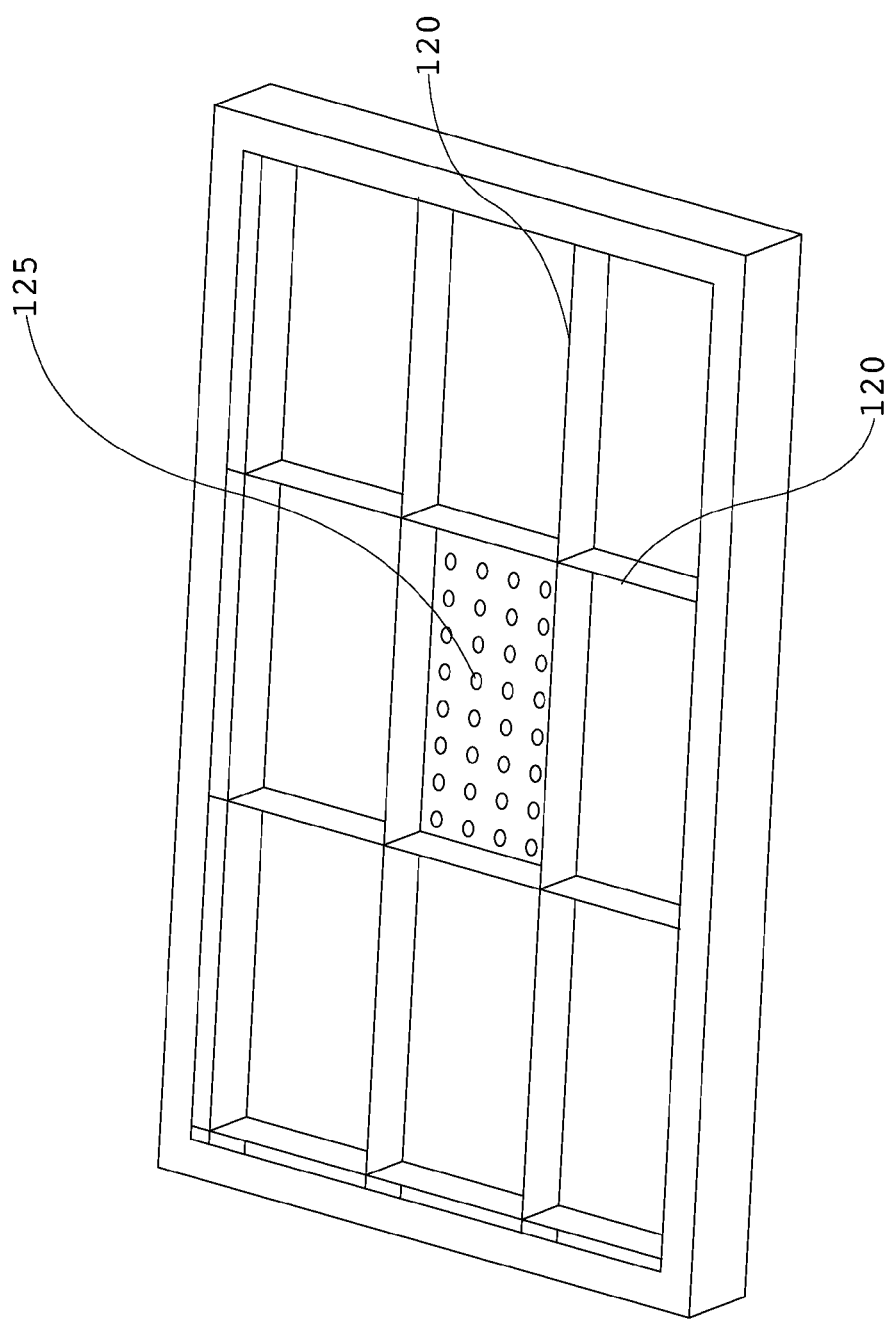
FIG. 11 is a perspective view of one embodiment for controlling the 'bleeding' of light between adjacent subsections of the backlight.

If using the gaussian relationship shown in FIG. 10, it may be advantageous to design the physical system such that this type of relationship actually exists. For example, the backlight and diffuser should be designed such that only 50% luminance exists at the overlapping edge of each subsection. FIG. 11 shows one method for accomplishing this specific embodiment, where an array of dividing walls 120 has been used between the backlight LEDs 125 and the diffusing element (not shown). FIG. 11 shows a simplified figure as only a 3×3 array is shown and the figure does not show LEDs in every subsection. However, as discussed above, the number of backlight subsections can vary depending on many different factors, and one skilled in the art can easily modify the simplified FIG. 11 into an 8×8 array (or any other arrangement) with LEDs in every subsection.

Preferably, there would be a gap between the end of the dividing walls 120 and the diffuser. This would prevent any of the dividing walls 120 from being visible through the final display. The precise geometry of the dividing walls 120 and their relationship to the diffuser may require fine tuning for each display. Acceptable results have been found for 70 inch LCD displays where the dividing walls 120 are about two to three inches high with a gap between the dividing wall 120 and diffuser of 30-40 mm.

As mentioned above, other mathematical models may be used to simulate the backlight through the diffuser. One other method is to use a point spread function (PSF). If the diffuser is treated like an optical low pass filter, then a 2D filter operation can be performed on the virtual backlight. One could also modify the PSF by observing that a diffused backlight only requires a blurring operation along the boundaries between subsections.

Figure 12:
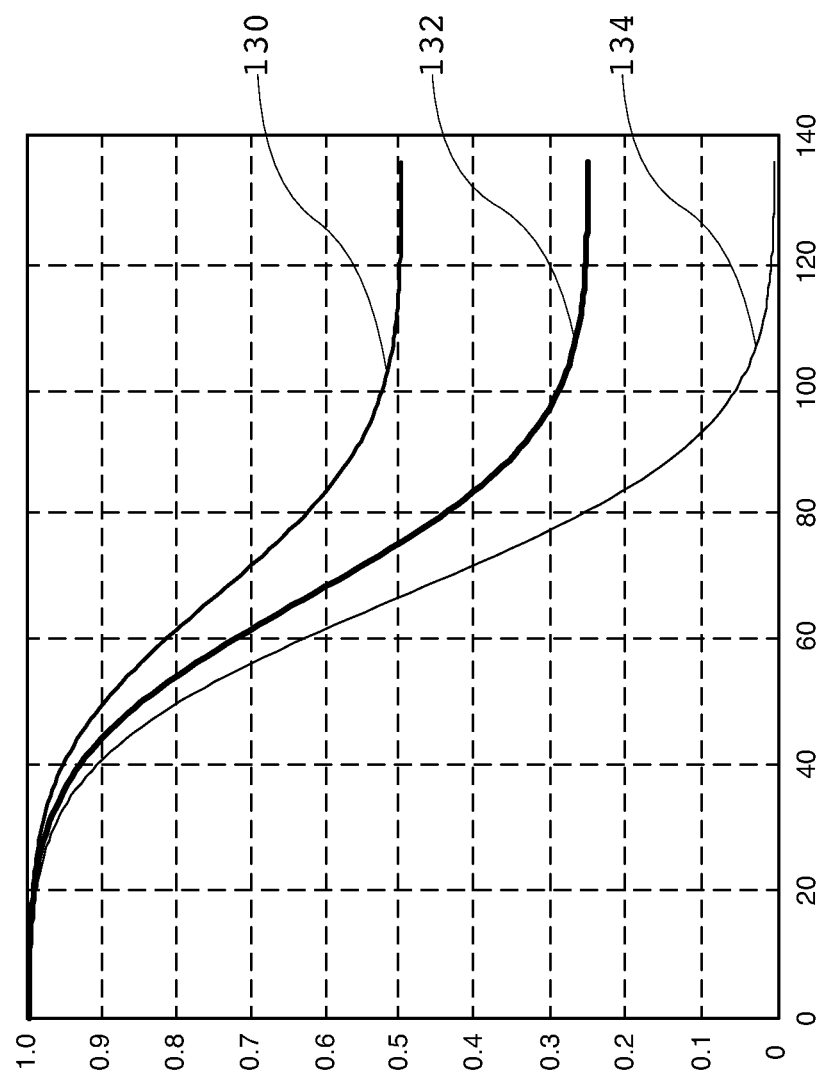
FIG. 12 is a plot of relative luminance versus physical position on subsections when using pre-determined brightness profiles.

An examination of the edges between a fully illuminated subsection and an adjacent dimmer subsection constructed via the Gaussian Point Spread Function reveals a series of common curves. FIG. 12 shows the change in relative illumination from 1 to 0.5 (curve 130), 1 to 0.25 (curve 132), and 1 to 0 (curve 134). If we denote Z(x) as the curve that goes from 1 to zero, then it is possible to recreate any change in brightness between adjoining subsections with the equation: $f(x)=y_1+Z(x)\cdot(y_0-y_1)$ where $y_0$ is the brightness of the starting subsection and $y_1$ is the brightness of the ending subsection.

Thus, a two-step process for this method could include: (1) Create a series of changing brightness lines that run vertically down the middle of each subsection using the above formula. If the subsections are rectangular, then a "longer" brightness function will be required for this operation and (2) Starting at the top of the VB, create a series of horizontal brightness curves using the data from step 1 as the endpoints for each curve.

A final technique to produce a virtual backlight would be through the use of Bezier Curves. In this approach, cubic splines could be used to interpolate between the subsection centers and thus simulate diffusion. For each point in the Virtual Backlight, the following equation would be calculated:

$$B(t)=(1-t)^3P_0+3t(1-t)^2P_1+3t^2(1-t)P_2+t^3P_3, t\in[0,1].$$

As discussed above, once the data for the VB has been generated, it may be divided into the corresponding subpixel voltages in order to properly rescale the LCD video image. This can be accomplished in many ways. Because division is typically a time-consuming operation, one exemplary embodiment may use a 256 byte lookup table of 8-bit scaling factors. These would be multiplied by each pixel and then followed by an 8-bit shift. The 8-bit shift can be skipped if only the upper byte of the product is used. If an overflow occurs, the resulting pixel value would be 255.

Before driving the backlight subsections with the appropriate luminance values, gamma correction may be applied. This step may help correct the contrast and may also provide additional power savings. Assuming backlight intensities from 0 to 255, one method of gamma correction may be: $I=255 \cdot (Y/255)^\gamma$ where $\gamma$ is typically equal to 2.2 (but this may be varied depending on the application). For example, assume that the luminance value (Y) for the subsection was calculated to be 128. When this value is used in the gamma equation above, the actual intensity of the backlight (I) is calculated to be 56. This backlight intensity (I) can now be converted to actual voltage/current and sent to the appropriate backlight subsection. Also, the re-scaled image data can now be sent to the LCD as the backlight is updated.

An example for the physical architecture which could perform the operations as discussed above is now presented. It should be pointed out that this architecture is only an example and those skilled in the art could modify this example or create other types of physical architecture which are capable of performing the operations discussed herein.

Figure 13:
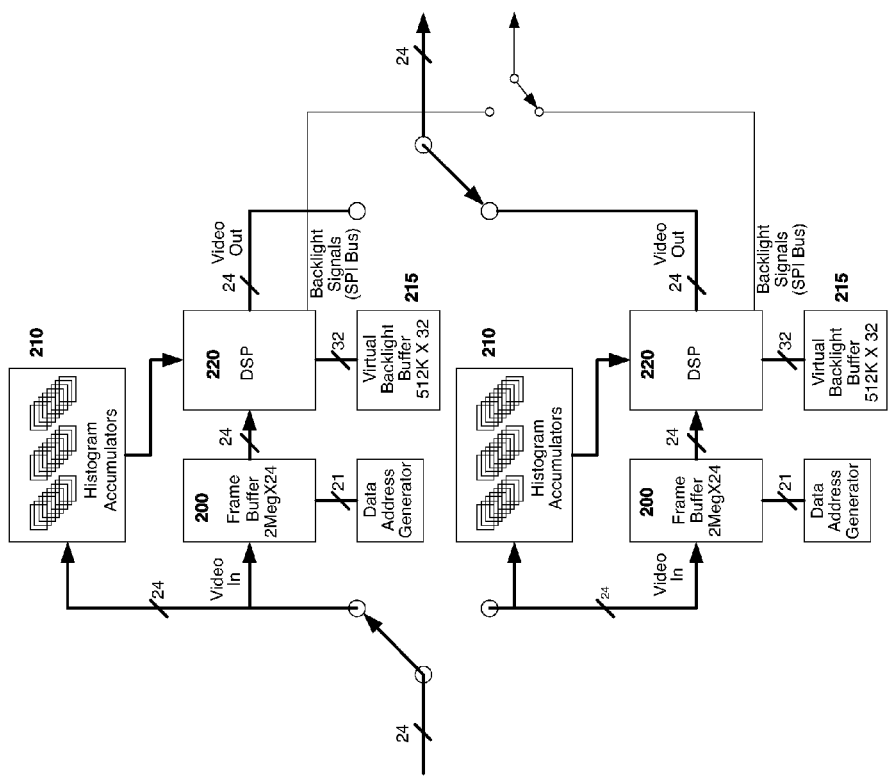
FIG. 13 is a schematic view of one embodiment for the physical architecture of controlling the dynamic backlight.

FIG. 13 shows a schematic representation of one example for the physical architecture. This specific example assumes the following: the input is RGB data on a 24-bit wide data bus, an 8×8 backlight array is used, the output is RGB data on a 24-bit wide data bus, an external pixel clock is available, the maximum LCD resolution is 1080 by 1920 for a total of 2,073,600 pixels, the Samsung LTI700HD01 is the assumed LCD, the design should support a pixel clock of 148.5 Mhz.

Two frame buffers 200 may be used to store the incoming frame and process and output the outgoing frame. Each frame buffer should store 2,073,600 RGB values and the width of the frame buffer should be at least 24 bits. Eight, three channel histogram accumulators 210 may be used for statistical processing. Each accumulator 210 should consist of 256 15-bit counters. There may be accumulators for each of the three color channels (if using an RGB-type LCD). The output of each counter should be double buffered. Two virtual backlight buffers 215 may be used to store newly created backlight based on incoming image data and rescale the gain of outgoing LCD data.

The embodiment for the architecture described here would implement the steps above using a "Pitch and Catch" approach. While one block is 'catching' and analyzing the incoming video data, the other block is scaling and 'pitching' video data to the output. As shown in FIG. 13, the upper half of the system is in "catch" mode. During this phase, incoming RGB data is sampled by the histogram accumulators 210 while being stored in the frame buffer 200. After 135 lines have been buffered, the contents of the twenty-four histogram accumulators 210 are made available to the digital signal processor 220 (DSP). The DSP 220 then calculates the brightness of each of the corresponding subsections and updates the virtual backlight buffer 215. This process is repeated seven more times for the remaining video data. Note that the last eight subsections placed into the virtual backlight may have to be calculated during the "vertical retrace" period.

The lower half of the system is operating in "pitch" mode. During this phase, each pixel from the input buffer 200 is divided by the corresponding pixel in the virtual backlight buffer 215 and sent to the video out MUX. To speed execution and avoid the use of a hardware divider, a lookup table may be used to determine a scaling factor. This factor can then be used to rescale the RGB data with three 8×8 multipliers. Concurrent with the rescaling operation, the individual subsections of the backlight matrix will be updated synchronously using the values calculated during the "catch" phase.

It should be noted that the system and method described herein has been described with reference to each 'frame' and in an exemplary embodiment the backlight subsections would be updated for each 'frame.' However, there are many different frame rates of video which exist as well as different refresh rates of LCD displays (ex. 60 Hz, 120 Hz, 240 Hz, etc.). As used herein, the term 'frame' represents each time that the pixel voltages are updated for the LCD display. Thus, the backlight subsections should preferably be updated (and the LCD subpixel voltages re-scaled) each time that a new set of subpixel data is sent to the LCD display.

Having shown and described preferred embodiments, those skilled in the art will realize that many variations and modifications may be made to affect the described embodiments and still be within the scope of the claims. Thus, many of the elements indicated above may be altered or replaced by different elements which will provide the same result and fall within the spirit of the claimed embodiments. It is the intention, therefore, to limit the invention only as indicated by the scope of the claims.

What is claimed is:

1. A method for driving LCD subpixels located within a first subsection of an LED backlight being driven at a first luminance and also within the tail portion of a second subsection of an LED backlight being driven at a second luminance, the method comprising the steps of:
   providing original subpixel voltages;
   providing a relative luminance versus subpixel position relationship which accepts subpixel positions and returns relative luminance values for the first and second subsections of the LED backlight;
   applying the relative luminance versus subpixel position relationship to the first luminance and second luminance to produce virtual backlight data for each subpixel;
   dividing the original subpixel voltages by a ratio of virtual backlight data to a maximum luminance to produce re-scaled subpixel voltages; and
   driving the subpixels with the re-scaled subpixel voltages.

2. The method of claim 1 wherein:
   the relative luminance versus subpixel position relationship is a Gaussian relationship.

3. The method of claim 1 wherein:
   the virtual backlight data for the subpixels which are located directly over an intersection of the first and second subsections is equal to one half of the first luminance plus one half of the second luminance.

4. The method of claim 1 further comprising the step of:
   providing a wall between the first and second subsections of the LED backlight which extends away from the LED backlight.

5. The method of claim 1 wherein:
   the relative luminance versus subpixel position relationship is a linear relationship.

6. The method of claim 1 wherein:
   the relative luminance versus subpixel position relationship is an exponential relationship.

7. The method of claim 1 wherein:
   the virtual backlight data is calculated as a percent of proper luminance for the first subsection added to a percent of proper luminance for the second subsection.

8. A method for driving LCD subpixels located within a first subsection of an LED backlight being driven at a proper luminance setting and having a maximum luminance setting, the method comprising the steps of:

providing original subpixel voltages;

dividing each original subpixel voltage by the ratio of proper luminance setting to maximum luminance setting to produce re-scaled subpixel voltages; and driving the subpixels with the re-scaled subpixel voltages.

9. The method of claim 8 further comprising:

determining if any subpixels are located within a tail portion of an adjacent second LED subsection and if so calculating virtual backlight data for the subpixels, applying the virtual backlight data to the original subpixel voltage to produce re-scaled subpixel voltages, and driving the subpixels with the re-scaled subpixel voltages.

10. The method of claim 9 wherein:

the step of applying the virtual backlight data to each subpixel is performed by dividing the original subpixel voltages by a ratio of virtual backlight data to the maximum luminance of the backlight subsection.

11. The method of claim 9 wherein:

the step of calculating virtual backlight data includes applying a relative luminance versus subpixel position relationship to each subpixel, said relationship accepts subpixel positions and returns relative luminance values for the first and second subsections of the LED backlight; and producing virtual backlight data for each subpixel based on the relative luminance values.

12. The method of claim 11 wherein:

the step of producing virtual backlight data for each subpixel based on the relative luminance values comprises adding a percent of proper luminance for the first subsection to a percent of proper luminance for the second subsection.

13. The method of claim 9 wherein:

the tail portion of an adjacent second LED subsection is defined by subpixels which are impaced by the luminance emitted from the adjacent second LED subsection.

14. The method of claim 9 wherein:

the tail portion of an adjacent second LED subsection is defined by the distance at which illumination emitted by the second subsection extends into the first subsection.

15. The method of claim 11 wherein:

the relative luminance versus subpixel position relationship is a Gaussian relationship.

16. The method of claim 11 wherein:

the virtual backlight data for the subpixels which are located directly over an intersection of the first and second subsections is equal to one half of the first luminance plus one half of the second luminance.

17. The method of claim 11 wherein:

the relative luminance versus subpixel position relationship is an exponential relationship.

18. A method for driving LCD subpixels located within a first subsection of an LED backlight being driven at a first proper luminance setting and having a maximum luminance setting, the first subsection being adjacent to a second LED subsection being driven at a second proper luminance, the method comprising the steps of:

accepting original subpixel voltages;

determining if any subpixels are located within a tail portion of the adjacent second LED subsection and if so calculating virtual backlight data for the subpixels, applying the virtual backlight data to the original subpixel voltage to produce re-scaled subpixel voltages, and if not dividing each original subpixel voltage by the ratio of proper luminance setting to maximum luminance setting to produce re-scaled subpixel voltages; and driving the subpixels with the re-scaled subpixel voltages.

19. The method of claim 18 wherein:

the step of applying the virtual backlight data to each subpixel is performed by dividing the original subpixel voltages by a ratio of virtual backlight data to the maximum luminance of the backlight subsection.

20. The method of claim 18 wherein:

the step of producing virtual backlight data for each subpixel based on the relative luminance values comprises adding a percent of proper luminance for the first subsection to a percent of proper luminance for the second subsection.

* * * * *